June 6, 1950     E. L. LIVERMORE     2,510,289
TELESCOPE MOUNT
Filed Sept. 2, 1947
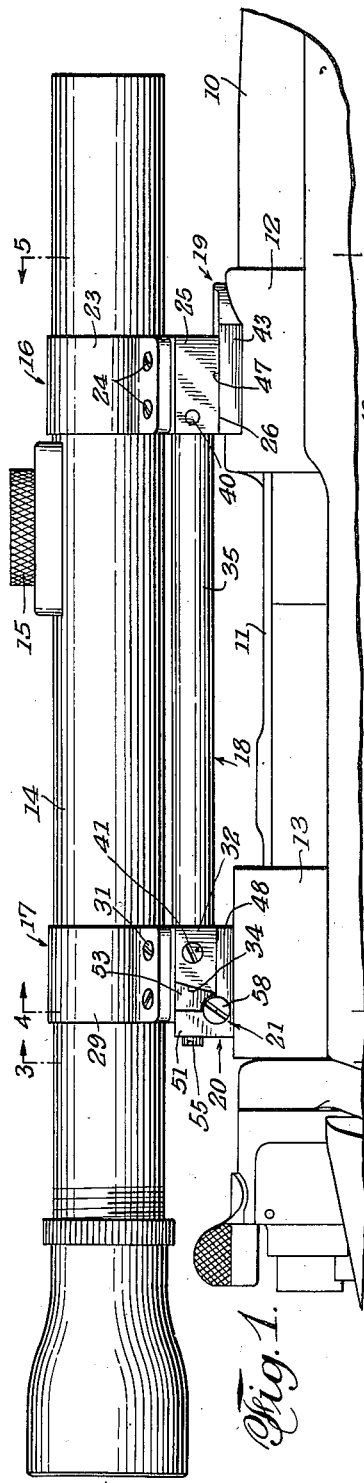
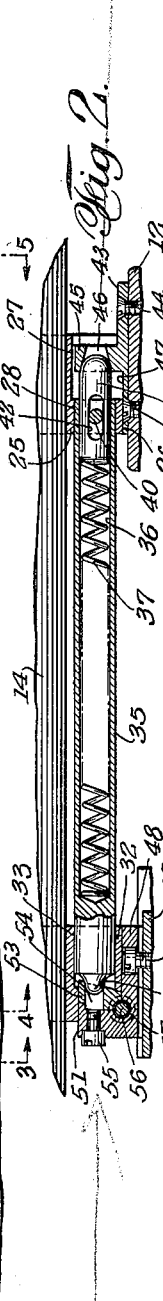
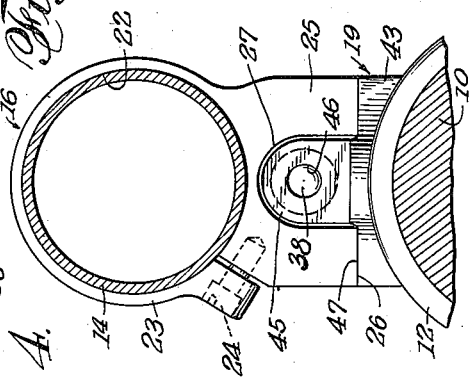
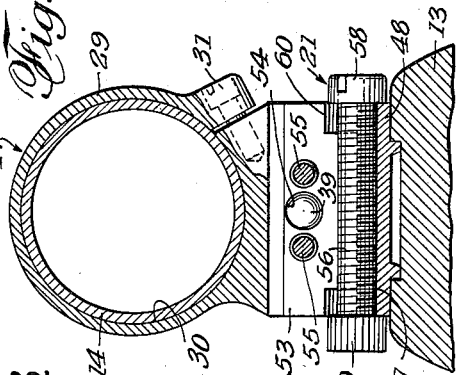
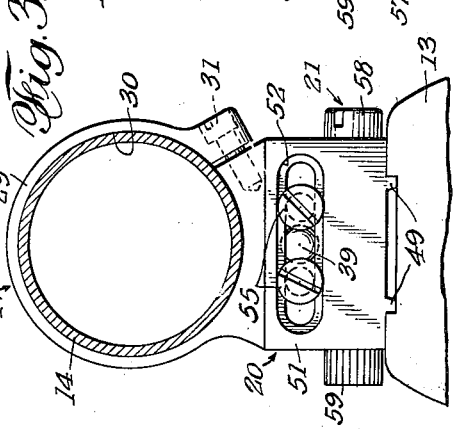
Inventor
EARL L. LIVERMORE
By C. G. Stratton
Attorney Patented June 6, 1950

2,510,289

UNITED STATES PATENT OFFICE 2,510,289

TELESCOPE MOUNT

Earl L. Livermore, Glendale, Calif.

Application September 2, 1947, Serial No. 771,811

9 Claims. (Cl. 33—50)

This invention relates to telescope mounts for firearms and has for its main object to provide a mount whereby a telescope is quickly and easily placed in operative position and as easily dismounted, the invention contemplating a simple endwise movement of the telescope to effect either mounting or dismounting thereof.

Another object of the present invention is to provide a telescope mount embodying effective means for cushioning a telescope against recoil shocks of the gun mounting said telescope.

Another object of the invention is to provide a mount, as indicated, in which is embodied means for adjusting a telescope for windage corrections.

A further object of the invention is to provide fixed elements on a gun which serve to mount a telescope and also comprise peep sights usable for sighting said gun with the telescope removed.

My invention also has for its object to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a partial side elevational view of a gun embodying the telescope mounts of the present invention.

Fig. 2 is a fragmentary longitudinal sectional view of said telescope mounts.

Figs. 3, 4 and 5 are enlarged cross-sectional views as taken on the respective lines 3—3, 4—4 and 5—5 of Fig. 1.

The gun illustrated in the drawing is conventional and includes a barrel 10, a breech 11, and metal blocks 12 and 13 at the front and rear of said breech, respectively. The telescope 14 which is shown is also conventional and the same, typically, includes elevation adjusting means 15. According to the present invention, the telescope is mounted in alignment with the barrel 10 thereabove so that a distant target may be sighted therethrough.

The mounts for said telescope comprise, generally, a front mount band 16, a rear mount band 17, a spring tube assembly 18 extending between said bands beneath the telescope extending through said bands, a front band mount 19 carried by gun block 12, and a rear band mount 20 carried by the gun block 13. The latter mount further includes a windage adjustment 21.

The front mount band 16 comprises a metal block formed with a bore 22 to receive the telescope and is formed with a band clamp 23 locked as by screws 24 for firmly clamping said telescope. The lower end of the mount band is formed as a block 25 having a flat finished surface 26 and formed with a recess 27 extending upwardly from said surface and with a bore 28 parallel to bore 22 and entering said recess.

The rear mount band 17 is similarly formed to have a clamp band 29 having a bore 30 and locked as by screws 31. The lower block 32 of said mount band is provided with a bore 33 that is aligned with bore 28. In this instance, block 32 is cut to have an angular face 34 comprising part of a dove-tail interlock with the rear band mount 20.

The spring tube assembly 18 comprises a tube 35 having an endwise bore 36 open at the front end, a compression spring 37 within said bore, a pin 38 projecting from said front end, and a reduced projection 39 on the opposite end of said tube. Tube 35 fits into bores 28 and 33 and is retained in assembly with the mount bands 16 and 17 by a transverse pin 40 passing through the tube and through block 25 and by a similar pin or by a set-screw 41 in block 32. Thus, the mount bands 16 and 17 can be relatively spaced in assembly to accord with the spacing of mount bases 19 and 20 and be retained in such assembly. The pin 38 is provided with an elongated transverse slot 42 through which pin 40 passes and thereby retains said pin captive against the action of spring 37.

The front mount base 19 is provided with a base plate 43 formed to fit block 12 and adapted to be fastened thereto as by screws 44. An upstanding lug 45 on said base plate is designed to loosely enter recess 27 of block 25 and the same is provided with a rearwardly flared conical hole 46 aligned with and adapted to receive the rounded nose of pin 38. The base plate 43 has an upper surface 47 against which the surface 26 bears.

The rear mount base 20 is formed with a base plate 48 to engage block 13 and the same is provided with cleats 49 to engage said block in a non-rotational manner. One or more screws 50 serve to fix said base plate in place. A rear, upwardly directed extension 51 is provided with a transverse slot 52 and fitted against said extension, on its forward side, there is provided a block 53 which is formed with the mating angular face for the angular face 34 forming the mentioned dove-tail interlock. Said block 53 is provided with a hole 54 to receive the reduced projection 39 of tube 35 and a pair of flanking screw seats for screws 55 extending through slot 52.

The windage adjustment 21 comprises a screw 56 which resides in a transverse screw seat 57 formed partly in mount base 20 and partly in block 53. The part of seat 57 that is in base mount 20 is without threads, whereas the part in block 53 is internally threaded and engaged with screw 56. A head 58, by means of which said screw 56 may be rotated, is provided at one end, and a graduated portion 59 is provided at the other end to indicate the degree of rotation of said screw, said heads holding the screw against endwise movement. Rotation of the screw effects transverse displacement of block 53 with respect to mount 20 by reason of the threaded engagement between said screw and block. Enlarged counter-bores 60 are provided on both sides of said block to accommodate head 58 and portion 59 when such windage adjustment is made. The screws 55 serve to lock the adjustment, as can be readily understood.

When assembling the device, the mount bases 19 and 20 are first fixed in position. The front mount band 16 is fixed to the telescope in a desired position for proper viewing by a person handling the gun. The rear mount band 17 is then locked in place in accordance with the spacing of the mount bases, and set screw 41 is tightened.

In use, with the telescope in place, easy removal is achieved by simply pushing forward on the telescope so as to extract projection 39 from hole 54. The telescope 14, together with bands 16 and 17, can then be tilted upwardly or laterally with the pin 38 fulcruming in hole 46 and removed from its mount bases. With the telescope thus removed, the aligned holes 46 and 54 serve as peep sights and, the latter being formed in adjustable block 53, windage adjustment is embodied. The telescope is readily mounted by inserting pin 38 into hole 46, pressing forward on the telescope to compress spring 37, and swinging the rear of the telescope down to align projections 39 and hole 54. Release of the telescope will permit the spring 37 to urge said projection into its hole and thereby firmly lock the assembly.

It will be noted that recoil shocks of the gun are transmitted to the telescope only by the lug 45 which is fiixedly attached to the gun. Since said lug can push only on pin 38, and the latter on spring 37, said recoil shocks are absorbed by said spring and the telescope is saved from the deleterious effects of such recoil shocks.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A telescope mount for a gun or the like, comprising longitudinally spaced mount bases fixed to the gun and having aligned apertures, spaced mount bands fixed to the telescope and having operative engagement with said mount bases, respectively, and spring-urged means carried by and extending between said bands for endwise engagement in the aligned apertures of said mount bases, whereby mounting and removal of the telescope is effected by a longitudinal movement of the telescope to contract said spring-urged means to disengage the same first from one mount base and then the other, said aligned apertures constituting peep sights when the telescope is removed.

2. A telescope mount for a gun or the like, comprising longitudinally spaced mount bases fixed to the gun and having aligned apertures, spaced mount bands fixed to the telescope and having operative engagement with said mount bases, respectively, one of said bases and its corresponding band being formed to have a dove-tail interlock, and spring-urged means carried by said bands for engagement in the aligned apertures of said mount bases, whereby mounting and removal of the telescope is effected by a longitudinal movement of the telescope, said aligned apertures constituting peep sights when the telescope is removed.

3. A telescope mount for a gun or the like, comprising longitudinally spaced mount bases fixed to the gun and having aligned apertures, spaced mount bands fixed to the telescope and having operative engagement with said mount bases, respectively, means for transversely adjusting one of said mount bases to thereby effect a lateral adjustment of the band associated therewith with respect to the other band, and spring-urged means carried by and extending between said bands for endwise engagement in the aligned apertures of said mount bases, whereby mounting and removal of the telescope is effected by a longitudinal movement of the telescope to contract said spring-urged means to disengage the same first from one mount base and then the other, said aligned apertures constituting peep sights when the telescope is removed.

4. A telescope mount for a gun or the like, comprising longitudinally spaced mount bases fixed to the gun and having aligned apertures, spaced mount bands fixed to the telescope and having operative engagement with said mount bases, respectively, and spring urged means carried by said bands for engagement in the aligned apertures of said mount bases, said means comprising a tube connecting the bands, an end portion of said tube engaging in the aperture of one base, a compression spring in the tube, and a pin urged by said spring into engagement in the aperture of the other base, said aligned apertures constituting peep sights when the telescope is removed.

5. A telescope mount for a gun or the like, comprising longitudinally spaced mount bases fixed to the gun, each base having an upstanding portion having an aperture therein and the apertures being aligned, spaced mount bands fixed to the telescope and having operative engagement with the bases, respectively, means for transversely adjusting one of said bases to thereby effect a lateral adjustment of the band associated therewith with respect to the other band, and spring-urged means carried by the bands and including a portion engageable in each of the mentioned apertures to thereby removably connect the respective bases and bands, said aligned apertures constituting peep sights when the telescope is removed.

6. A telescope mount for a gun or the like, comprising longitudinally spaced mount bases fixed to the gun, each base having an upstanding portion having an aperture therein and the apertures being aligned, spaced mount bands fixed to the telescope and having operative engagement with the bases, respectively, and spring-urged means carried by the bands for engagement with said apertured portions, said means comprising a tube connecting the bands, an end projection of said tube engaging in the aperture of one base portion, a compression spring in the tube, and a pin urged by said spring into engagement with the aperture of the other base, said aligned apertures constituting peep sights when the telescope is removed.

7. In a telescope mount for guns or the like, forward and rear mount bases fixed to the gun, each of said bases being apertured and said apertures being aligned, a telescope, and means connected with the telescope having removable non-yielding engagement in the aperture of the rear base and removable yielding engagement in the aperture of the front base, whereby recoil shocks of the gun transmitted through said front base are absorbed by said telescope-connected means.

8. In a telescope mount for guns or the like, forward and rear mount bases fixed to the gun, each of said bases being apertured and said apertures being aligned, means on the rear base for adjusting the same laterally, a telescope, and means connected with the telescope having removable non-yielding engagement in the aperture of the rear base and removable yielding engagement in the aperture of the front base, whereby recoil shocks of the gun transmitted through said front base are absorbed by said telescope-connected means.

9. In a telescope mount for guns or the like, forward and rear mount bases fixed to the gun, each of said bases being apertured and said apertures being aligned, means on the rear base for adjusting the same laterally, said means comprising a block fixed to the gun and a laterally movable block in which the mentioned aperture is formed and a screw extending through a common transverse seat formed in both the fixed and movable blocks, said screw being threadedly engaged only with the movable block, a telescope, and means connected with the telescope having removable non-yielding engagement in the aperture of the rear base and removable yielding engagement in the aperture of the front base, whereby recoil shocks of the gun transmitted through said front base are absorbed by said telescope-connected means.

EARL L. LIVERMORE.

REFERENCES CITED

The following references are of record in the file of this patent:

UNITED STATES PATENTS

| Number | Name | Date |
| --- | --- | --- |
| 371,850 | Maynard | Oct. 18, 1887 |
| 1,641,019 | Woods | Aug. 30, 1927 |
| 2,036,290 | McCann | Apr. 7, 1936 |
| 2,115,618 | Carl | Apr. 26, 1938 |
| 2,125,828 | Turner | Aug. 2, 1938 |
| 2,306,972 | Meisel | Dec. 29, 1942 |
| 2,365,976 | Sorensen | Dec. 26, 1944 |
| 2,401,825 | Gruver | June 11, 1946 |
| 2,452,145 | Pike | Oct. 26, 1948 |
| 2,475,383 | Foster | July 5, 1949 |

FOREIGN PATENTS

| Number | Country | Date |
| --- | --- | --- |
| 492,773 | France | 1919 |